(12) United States Patent
Raghavan et al.

(10) Patent No.: US 11,797,549 B2
(45) Date of Patent: *Oct. 24, 2023

(54) TECHNIQUES FOR LINKING DATA TO PROVIDE IMPROVED SEARCHING CAPABILITIES

(71) Applicant: Oracle International Corporation, Redwood Shores, CA (US)

(72) Inventors: Gopal Srinivasa Raghavan, Bangalore (IN); Abhiram Madhukar Gujjewar, San Ramon, CA (US); Ganesh Seetharaman, Redwood City, CA (US); Jai Motwani, Bangalore (IN); Sayon Dutta, Bengaluru (IN); Rajat Mahajan, Bengaluru (IN); Manasjyoti Sharma, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/987,668

(22) Filed: Nov. 15, 2022

(65) Prior Publication Data
US 2023/0076308 A1 Mar. 9, 2023

Related U.S. Application Data

(63) Continuation of application No. 17/379,860, filed on Jul. 19, 2021, now Pat. No. 11,531,675.

(51) Int. Cl.
*G06F 17/00* (2019.01)
*G06F 7/00* (2006.01)
(Continued)

(52) U.S. Cl.
CPC ...... *G06F 16/24578* (2019.01); *G06F 16/221* (2019.01); *G06F 16/2246* (2019.01);
(Continued)

(58) Field of Classification Search
CPC ............. G06F 16/24578; G06F 16/221; G06F 16/2246; G06F 16/2255; G06F 16/248; G06N 20/00
(Continued)

(56) References Cited

U.S. PATENT DOCUMENTS 9,495,614 B1 * 11/2016 Boman .................... G06F 16/29
10,162,967 B1 * 12/2018 Oliver .................... G06F 21/565
(Continued)

*Primary Examiner* — Pavan Mamillapalli
(74) *Attorney, Agent, or Firm* — Kilpatrick Townsend & Stockton LLP

(57) ABSTRACT

A machine-learning model may be previously trained with a supervised learning algorithm to identify whether a pair of labels provided as input are similar. A locality sensitive hashing forest (LSH) may be generated for the set of candidate labels. When a user later identifies an input label (e.g., by search query, by interface selection, etc.) the input label may be used to query the LSH forest to identify a subset of the candidate labels. This subset may be used to generate respective pairs comprising the input label, one of the subset candidate labels, and a corresponding feature set generated for the pair. This data may be provided to the model to identify a degree to which the pair of labels are similar. The user may be provided one or more recommendations including similar terms identified from the model's output.

20 Claims, 12 Drawing Sheets

(51) Int. Cl.
  *G06F 16/2457* (2019.01)
  *G06F 16/22* (2019.01)
  *G06N 20/00* (2019.01)
  *G06F 16/248* (2019.01)

(52) U.S. Cl.
  CPC ........ *G06F 16/2255* (2019.01); *G06F 16/248* (2019.01); *G06N 20/00* (2019.01)

(58) Field of Classification Search
  USPC ........................................................ 707/728
  See application file for complete search history.

(56) References Cited

U.S. PATENT DOCUMENTS

| | | | |
|---|---|---|---|
| 11,176,154 B1* | 11/2021 | Dasgupta | G06K 9/6253 |
| 2011/0136542 A1* | 6/2011 | Sathish | H04M 1/72454 |
| | | | 455/566 |
| 2013/0297661 A1* | 11/2013 | Jagota | G06F 16/11 |
| | | | 707/822 |
| 2014/0068772 A1* | 3/2014 | Topan | H04L 63/101 |
| | | | 726/23 |
| 2014/0201180 A1* | 7/2014 | Fatourechi | G06F 16/951 |
| | | | 707/706 |
| 2017/0093893 A1* | 3/2017 | Davydov | G06F 21/51 |
| 2017/0262633 A1* | 9/2017 | Miserendino | G06K 9/6262 |
| 2018/0218153 A1* | 8/2018 | Edwards | G06F 21/566 |
| 2019/0188313 A1* | 6/2019 | Bansal | G06F 16/285 |
| 2019/0236460 A1* | 8/2019 | Jagota | G06N 5/025 |
| 2019/0236478 A1* | 8/2019 | Wu | G06Q 30/0282 |
| 2022/0165143 A1* | 5/2022 | Pourmohammad | G06F 40/30 |

* cited by examiner

| Technical Term/Label | Domain Term/Label | Similarity Value |
|---|---|---|
| CUST_ADD123_ID4 | Customer Address | Similar |
| CUSTOMER4_ADD | Customer Address | Similar |
| PROD_ID | Product Identifier | Similar |
| PROD_DESC | Product Description | Similar |
| PROD_INFO | Product Information | Similar |
| PMT | Payment | Similar |
| CUST | Customary | Disparate |
| PROD | Produce | Disparate |
| ... | ... | ... |

*FIG. 3*

TECHNIQUES FOR LINKING DATA TO PROVIDE IMPROVED SEARCHING CAPABILITIES

CROSS-REFERENCE TO RELATED APPLICATIONS

This application is a continuation of U.S. patent application Ser. No. 17/379,860, filed on Jul. 19, 2021, entitled "TECHNIQUES FOR LINKING DATA TO PROVIDE IMPROVED SEARCHING CAPABILITIES," the entirety of which is incorporated by reference for all purposes.

BACKGROUND

Organizations use cloud computing environments to produce data using a variety of data sources and data services such as data lakes, data warehouses, analytics, and the like. The variety and amount of this data makes it difficult for data producers such as data engineers, data stewards, data scientists, and the like to find trusted data and understand that data to improve data governance. Discovering and managing this data is beneficial for various tasks. Some cloud computing systems include a data management service that enables users to discover, organize, enrich, and trace organization's technical metadata and data assets. The user may utilize the service to enrich knowledge of available data by classifying data entities (e.g., a database table or view, logical files, etc.) and attributes according to domain definitions. Organizing data assets based on such definitions provides deep insights when compared to the characteristics of technical metadata (e.g., based on storage names, column names, etc.). Today, such a discovery based on domain definitions, requires manual linking of domain definition to the technical metadata. The user can manually add data assets and entities and annotate these objects to improve productivity. Manual search and linking is an onerous and time-consuming task and tend not to be scalable when the volume of metadata grows over a period.

BRIEF SUMMARY

Techniques are provided (e.g., a method, a system, non-transitory computer-readable medium storing code or instructions executable by one or more processors) for provisioning resources of a cloud-computing environment to a user based at least in part on user-defined constraints. Various embodiments are described herein, including methods, systems, non-transitory computer-readable storage media storing programs, code, or instructions executable by one or more processors, and the like.

One embodiment is directed to a method for recommending one or more similar labels for a label provided as input. The method may include obtaining, by a computing device, a machine-learning model that is configured to identify a similarity between a first label and a second label provided as input. In some embodiments, the machine-learning model has been previously trained based at least in part on a supervised learning algorithm and a training data set including pairs of labels that have been previously identified as being valid or invalid pairs (e.g., similar, or disparate). In some embodiments, the first label corresponds to a technical label for a data entity and the second label corresponds to a domain term. Similar techniques may be employed using a domain term as the first label and the technical label as the second label. The method may further include generating a locality sensitive hashing forest based at least in part on one or more respective n-gram tokens generated from respective domain labels of a plurality of domain labels (e.g., a predefined glossary). The method may further include receiving, from a user interface, user input identifying an input label. The method may further include identifying a plurality of candidate labels from the locality sensitive hashing forest based at least in part on querying the locality sensitive hashing forest using one or more n-gram tokens generated from the input label. In some embodiments, the plurality of candidate labels comprises a subset of domain labels from the plurality of domain labels. The method may further include generating a respective pairing for the input label and each candidate label of the plurality of candidate labels. The method may further include generating a respective feature set for each respective pairing of the input label and each candidate label. The method may further include providing each respective feature set to the machine-learning model as input. The method may further include receiving output from the machine-learning model identifying one or more of the candidate labels as one or more recommended labels. In some embodiments, the one or more recommended labels are identified by the output as being similar to the input term. The method may further include providing, via the user interface, one or more recommendations corresponding to the one or more recommended terms identified by the machine-learning model.

Another embodiment is directed to a data management service comprising one or more processors and one or more non-transitory computer-readable instructions that, when executed by one or more processors of a computing device, cause the computing device to perform the disclosed methods.

Yet another embodiment is directed to a non-transitory computer-readable storage medium storing computer-executable instructions that, when executed by one or more processors of a computing device, cause the computing device to perform the disclosed methods.

The foregoing, together with other features and embodiments will become more apparent upon referring to the following specification, claims, and accompanying drawings.

BRIEF DESCRIPTION OF THE DRAWINGS

Various embodiments in accordance with the present disclosure will be described with reference to the drawings, in which:

FIG. 3 illustrates an example training data set, in accordance with at least one embodiment.

DETAILED DESCRIPTION

Figure 1:
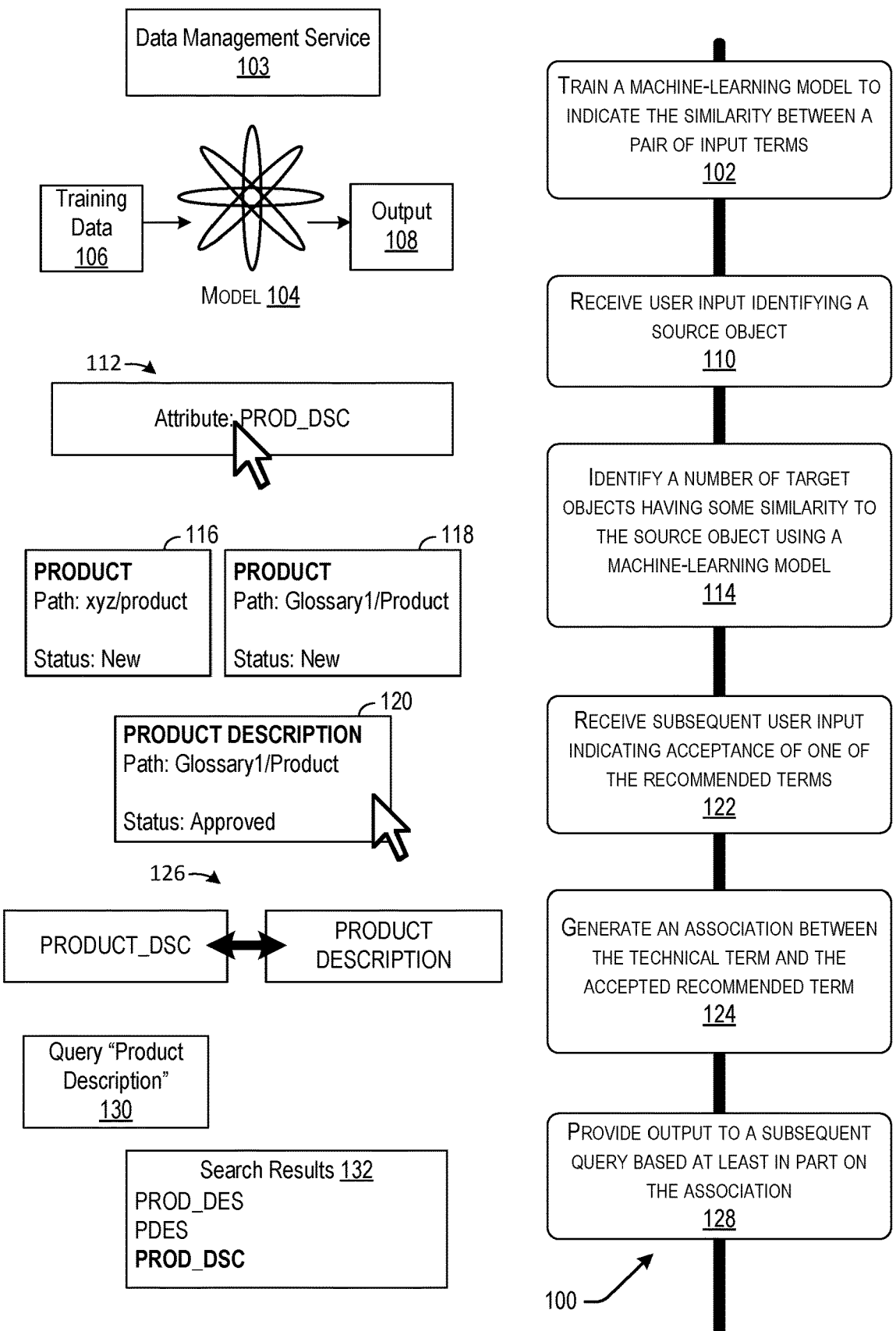
FIG. 1 illustrates an example flow for identifying a recommended label for an input term, in accordance with at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to techniques for linking data to provide improved searching capabilities. These improved searching capabilities may be realized in many contexts. By way of example, a cloud-computing data catalog (referred to as a "data catalog" for brevity) may be configured to include a glossary (e.g., a set of domain terms for which definitions are known to one trained in the given domain such as medical terms, marketing terms, etc.) and a set of technical metadata (e.g., one or more terms and/or labels associated with a data entity such as a file, an object, a container, a data structure, a portion of an object/container/data structure (e.g., an attribute, a column, a row of a database, a data field, etc.) associated with a tenant. The terms "term" and "label" may be used synonymously herein. The cloud-computing data catalog may be managed by a data management service of a cloud-computing environment.

In some embodiments, technical metadata (e.g., a technical term) used to label one or more technical data entities may vary widely from the domain terms that are known and used by practitioners within the domain. For example, a database or column of a database may be labeled "CUST_ADDS." A user that is knowledgeable in the given domain may recognize this label as indicating a technical label for a data entity (e.g., the database or column) that contains customer addresses. However, were the user to search the data catalog using the more widely used domain term, such as "customer address," or "customer addresses," the data catalog would not automatically identify the database or column as being related to the provided search terms. Conventionally, a user may manually link (e.g., associate) the technical metadata (e.g., the technical label "CUST_ADDS") with a particular domain label (e.g., "customer address"). Once linked, a subsequent search of the data catalog for the particular domain label (e.g., "customer address") would then result in a set of search results that would include the technical metadata associated with that domain label such as "CUST_ADDS" from the technical metadata manually linked to the domain label by the user. However, when the data catalog includes tens, hundreds, thousands, or more instances of technical metadata and/or domain terms, the manual process for establishing relationships between technical labels used for data entities to domain terms can be an arduous task that requires vast amount of manpower and time as well as specialized knowledge. Improvements to identifying these label associations would be beneficial in more efficiently improving the data catalog's ability to identify related data entities during search or at any suitable time (e.g., at startup, periodically, or the like).

In some embodiments, a locality sensitive hashing (LSH) forest may be generated for a collection of domain terms (e.g., one or more predefined glossaries provided by the data management service). These domain terms may be part of a predefined glossary that identifies the domain terms and, in some embodiments, the definitions and/or meanings corresponding to those domain terms. In some embodiments, a number of n-gram tokens may be generated for each domain term. The characters within each token (e.g., the "n" in n-gram) may be predefined or user configurable. In some embodiments, a minimum-hash matrix may be generated for some number of permutations of the n-gram token for a given term. A number of locality sensitive hashing trees may be generated from the n-gram tokens such that the minimum-hash matrices of the n-gram token are represented as paths within a tree of the LSH forest. To generate the LSH forest, a set of n-grams including various permutations of those n-grams are hashed with a locality sensitive hashing function (also referred to as a "hashing function," for brevity). The hashing function may be configured such that similar objects (e.g., similar sets of n-gram tokens) are much more likely to collide (e.g., hash to a same "bucket," in this example, a tree) than dissimilar n-gram token sets. Each LSH tree, by virtue of the hashing algorithm used to hash the n-grams, may include a set of domain terms that are similar to one another to some degree. Some examples of similarity measurements used in such LSH forests may include a Jaccard coefficient, a Hamming metric, and the like. It should be appreciated that similar techniques may be used to generate an LSH forest of technical labels such that recommendations can be provided in a bi-directional manner (e.g., from domain label to technical label, and vice versa).

As another preprocessing step, a machine-learning model may be trained to identify a similarity score quantifying a degree of similarity between two terms (e.g., a label associated with a technical/data entity and a domain term). The machine-learning model may be trained utilizing any suitable supervised machine-learning algorithm and a labeled training data set. In some embodiments, the labeled training data set may include pairs of terms for which a degree of similarity has already been assessed. In some embodiments, the degree of similarity of the training data set may indicate that the pair of terms are similar (e.g., indicated with value 1), or disparate (e.g., indicated with a value of 0). In some embodiments, a feature set may be generated for each term of a pair and these feature sets may be used to train the model. The generation of the feature set is elaborated in more detail below with respect to FIG. 4. In some embodiments, the respective feature set for each term may be included in the training data set. Once trained, the accuracy of the machine-learning model may be assessed. In some embodiments, a portion (e.g., 60%) of the training data set may be utilized to train the machine-learning model. Another portion (e.g., 20%) of the training data set may be utilized to tune the model. Some portion of the training data set (e.g., a remaining 20%) may be utilized as a test set to assess the model's accuracy (e.g., an amount/percentage by which the output of the model agrees or disagrees with the pairings of the remaining portion of the training data set).

At run time, a user may browse within a data catalog maintained by a data management service. The data catalog may include user interfaces for accessing glossary terms (also referred to herein as "domain terms," and technical metadata (e.g., data that identifies aspects of a technical entity such as a file, database, object, structure, or the like, and any suitable portion of the same). When the user navigates to a network page corresponding to a domain term, a number of recommendations corresponding to labels associated with respective technical entities can be presented at the user interface. Likewise, should the user navigate to a network page associated with a data entity (e.g., a row of a database), the user may be presented with a number of recommended domain terms. The user can provide user input (e.g., via a user device operated by the user) indicating that a number of selected terms are to be associated with the term corresponding to the network page from which the user input was provided. The association between the technical metadata (e.g., a technical label) and the domain label may be persisted. Subsequently, a search query may be received that is similar to some degree to the domain label. In response to the search query, the associated technical label(s) may be identified and the technical metadata corresponding to those entities may be returned as part of the set of search results obtained using the query.

In some embodiments, an association between technical labels and domain labels may occur in an automated fashion and not necessarily triggered by user input. For example, at startup, or at another suitable time, the service may attempt to identify one or more technical labels for each domain label, or vice versa, using similar techniques as discussed above. In some embodiments, an association may be automatically generated when the output of the model indicates a degree of similarity between the two input terms that exceeds some predefined threshold.

The techniques discussed herein provide for an improved user experience as users need not be sophisticated or particularly knowledgeable. With these associations in place, technical entities may be identified by their corresponding domain terms, and vice versa. This process may be performed at any suitable time (e.g., on startup, as part of a preprocessing step performed before runtime). In some embodiments, a recommendation can be provided to the user before an association is made. In other embodiments, if confidence is high enough that the pair of technical and domain terms are similar (e.g., having over a threshold amount of similarity), an association may automatically be generated between the two. These techniques can save significant time and effort of the data owners and data administrators. Additionally, a user need not have prior knowledge and/or training setting up these types of associations.

Moving on to FIG. 1, which illustrates an example flow 100 for identifying a recommended term for an input term, in accordance with at least one embodiment. By way of example, an input term may be a domain term that is part of a predefined glossary and the recommendation label sought may correspond to a technical term that is deemed to be similar to the domain term. Conversely, the input term may be a technical term (e.g., a technical term associated with one or more data entities such as a database, file, container, data object, or any suitable portion of the same), and the recommended label may correspond to a domain term from the predefined glossary. The operations discussed with respect to FIG. 1 (and expanded upon in connection with FIGS. 2-7) may be executed by a recommendation engine. In some embodiments, this recommendation engine may operate as part of a data management service 103. Data management service 103 may be configured to manage a data catalog including any suitable number of domain terms corresponding to any suitable number of predefined domain term sets (e.g., glossaries) and any suitable number of technical terms corresponding to one or more data entities (e.g., a database, a file, a container, a data object, etc., or any suitable portion of the same). The data management service 103 may operate as a component of the cloud-computing patterns described below with respect to FIGS. 8-12.

The flow 100 may begin at 102, where a machine-learning model may be trained to indicate the similarity between a pair of input terms. The machine-learning model (e.g., model 104) may be trained utilizing any suitable supervised learning algorithm and training data 106. Each example of the training data may include two terms (e.g., a domain term and a technical term), a feature set generated from the two terms, and a label indicating a degree to which the two terms are similar. An example training data set is discussed in more detail with FIG. 3. Generation of a feature set is discussed in more detail with respect to FIG. 4. The training process itself is elaborated on more fully with respect to FIG. 2. Through this training process, the model 104 may be configured to provide output 108. Output 108 may provide a score indicating a degree to which the pair of terms were determined to be similar. In some embodiments, output 108 may include a confidence score that indicate a degree of confidence associated with a determination that the two input terms are similar although other indications identifying a degree of similarity between the two input terms are contemplated. For example, the output 108 could include a score quantifying a degree of similarity (e.g., 0.8 indicating 80% similarity, etc.) or the like.

At 110, user input may be received identifying a source object. By way of example, a user interface may be provided (not depicted) that provides an option to select an option associated with a source object (e.g., a term for which a similar term is to be sought). As a non-limiting example, the source object could be a technical term associated with one or more data entities. For example, the user may select a link associated with an attribute of a database (e.g., a column of a database) labeled "PROD_DSC" as depicted at 112. The selection of this link may be considered user input identifying the label/term "PROD_DSC" as the source object.

At 114, a number of target objects may be identified as having some similarity to the source object. By way of example, a set of target objects may include domain terms from a glossary. These domain terms (e.g., "Product Description," "Product Information," "Product," "Time," "Price," "Payment," etc.) may correspond to a definition within the glossary. These domain terms may be terms that are regularly used and understood by those practicing within the given domain (e.g., a medical field, a marketing field, a business, etc.). The particular terms included in such a glossary may depend on the context and domain utilized. To identify the number of target objects (e.g., one or more domain terms having some threshold degree of similarity) a number of candidate pairs (e.g., one or more pairs including the target object and one of the domain terms) may be provided as input to the model 202. In some embodiments, the candidate pairs may not correspond to every known domain term. Rather, a subset of the domain terms (e.g., a candidate set of domain terms) may be identified. Techniques for identifying such a subset are discussed in more detail with respect to FIGS. 5 and 6. As a non-limiting example, domain terms corresponding to recommendations 116, 118, and 120 may be selected as the domain terms being most-similar to the source object (e.g., technical term "PROD_DSC"). In some embodiments, multiple glossaries may be used and in these examples, some of the recommendations may correspond to different glossaries. Thus, in some embodiments, a recommendation can include additional metadata such as a path indicating a source of the recommended term (e.g., glossary "xyz", glossary "Glossary 1," etc.). In some embodiments, the additional metadata associated with the recommendation can indicate whether the recommended term has previously been accepted (e.g., by the user or other users) as being similar to the source object (e.g., "PROD_DSC").

At 122, subsequent user input may be received indicating acceptance (or rejection) of one of the recommended terms. At 124, if the user input indicates acceptance, the accepted term may be associated with the source object and an association between the two terms (e.g., association 126) may be stored for subsequent use.

At 128, the association 126 may be utilized to provide output to a subsequent query. By way of example, a user may enter in a query "Product Description" (e.g., Query 130) in a search interface. A search algorithm may be executed to identify corresponding terms and/or data entities that correspond to the query. A set of associations (e.g., including the association 126) may be utilized to identify corresponding terms and/or data entities. Thus, given a domain term "Product Description" as a query, the technical term "PROD_DSC" may be included as part of the search results 132 provided in response to the query. These techniques enable the user to search for data entities (e.g., data entities corresponding to a technical term) by a domain term (e.g., a more commonly used/known term in the field in which this recommendation is provided) rather than having to have knowledge of the actual name of the data entity (e.g., "PROD_DSC") which may be obscure or difficult to remember.

Similar techniques may be employed to enable the user to select a domain term from a glossary and be presented with a set of technical terms corresponding to data entities within the system. As yet another example, the techniques discussed herein and with respect to FIG. 1, may be utilized to enable the user to select a data entity corresponding to a technical term (e.g., access a network page associated with a data base column "PROD_DSC").

Figure 2:
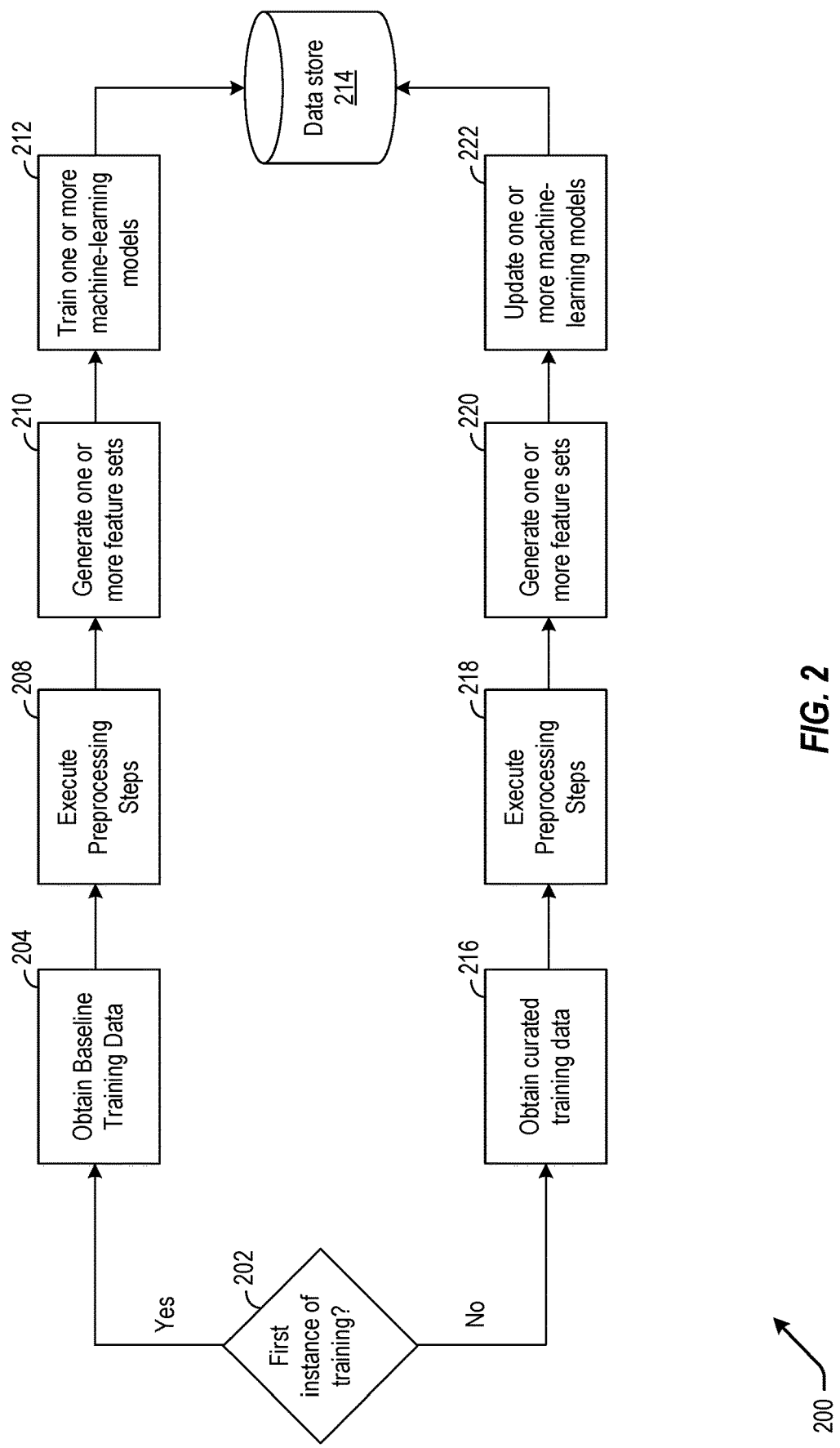
FIG. 2 illustrates an example method for training and/or updating a machine-learning model, in accordance with at least one embodiment.

FIG. 2 illustrates an example method 200 for training and/or updating a machine-learning model, in accordance with at least one embodiment. In some embodiments, the method 200 may be performed by a data management service (e.g., the data management service 103 of FIG. 1). The data management service may operate as any suitable part of the cloud-computing patterns of FIGS. 8-12. In some embodiments, the method 200 may be performed by a computing component different from the data management service and the machine-learning model may be accessible to the data management service.

The method 200 may begin at 202, where a determination may be made as to whether a given model has yet to be trained (e.g., is this a first instance of training for this model?). If so, the method 200 may proceed to 204. If it is determined that the model has already previously been trained, then the training data is to be used to update the previously-trained model and the method 200 may proceed to 216.

When initially training the model, a baseline training data set may be obtained at 204. This training data set may be obtained from predetermined and obtained from storage. FIG. 3 illustrates an example training data set 300, in accordance with at least one embodiment. In some embodiments, the training data set 300 may be generated by a data management service (e.g., the data management service 103 of FIG. 1). In some embodiments, the training data set 300 may be generated by a computing component different from the data management service and accessible to the data management service.

Figure 4:
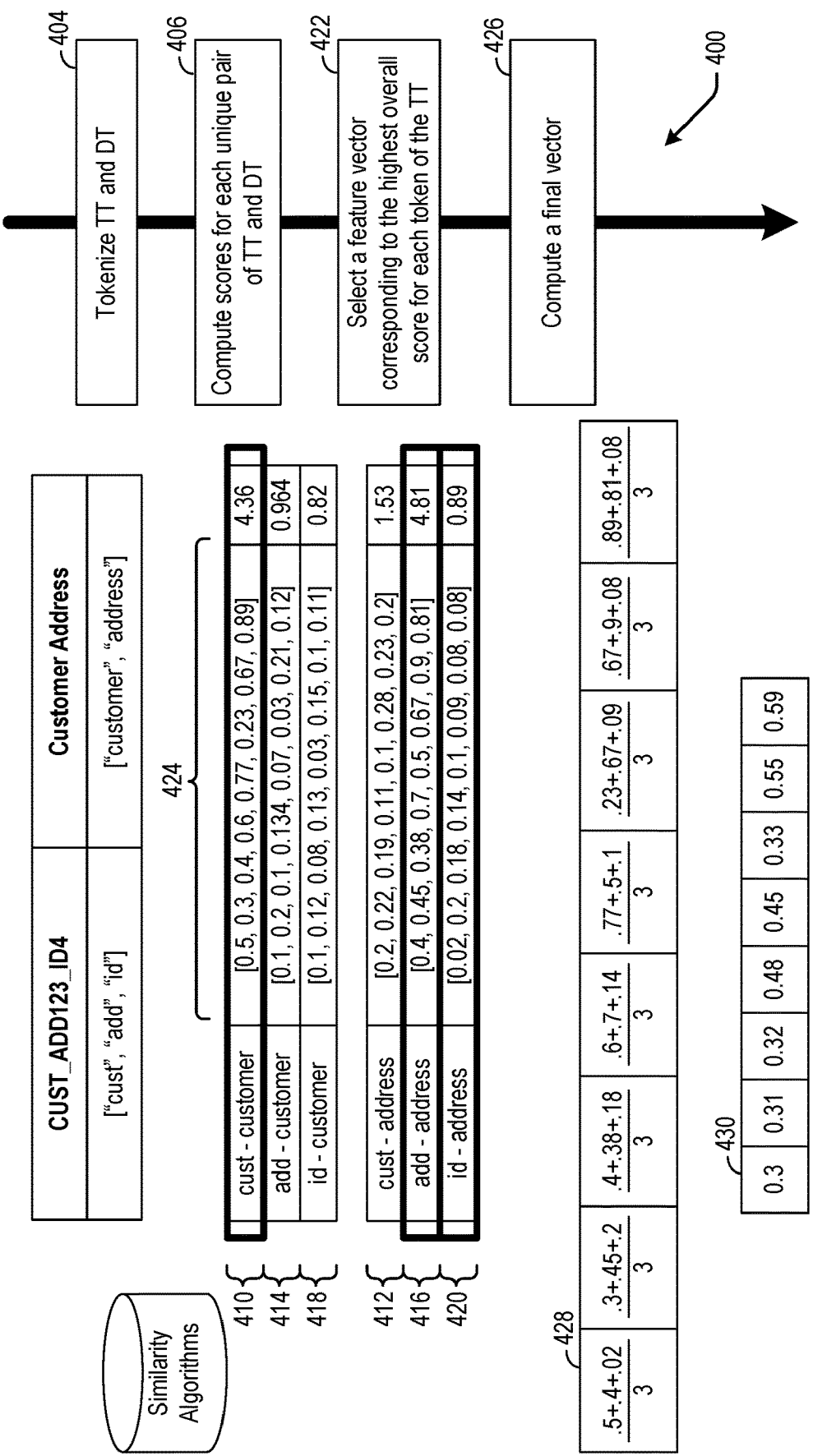
FIG. 4 illustrates a method for generating a feature vector corresponding to a pair of terms, in accordance with at least one embodiment.

Training data set 300 may include pairings (also called associations) between two terms/labels. By way of example, column 302 may include any suitable number of technical terms/labels (e.g., one or more technical labels that are individually associated with one or more technical data entities such as a database, object, container, file, or any suitable portion thereof). Column 304 may include any suitable number of domain terms/labels which individually correspond to the technical terms/labels of column 302. Column 306 may include similarity values that indicate a degree of similarity between a pair of terms/labels (e.g., between a pair of labels of a given row). Although the similarity value is expressed here as a label itself (e.g., similar/disparate), the similarity value may be expressed as a Boolean value, as an integer (e.g., 1=Similar, 0=Disparate), as a percentage (e.g., 0.65 similar, equivalent to 0.35 disparate), or any suitable measurement and/or indication of similarity and/or disparity. For simplicity, the training data set 300 is not depicted as including a feature set associated with each label, but it should be understood that a training data set used to in a process for training may additionally include a feature set of corresponding terms/labels in a given pair (e.g., a row). FIGS. 2 and 4 further discuss the usage and content of some example feature sets.

Returning to FIG. 2, once the baseline training data set (e.g., training data set 300 of FIG. 3) is obtained, the method 200 may proceed to 208, where a set of preprocessing steps may be executed. In some embodiments, a first set of preprocessing steps may be performed on the technical terms/labels of the training data set. By way of example, the first set of preprocessing steps may include trimming preceding and/or succeeding blank spaces if any exist in the technical term. In some embodiments, the first set of preprocessing steps may include replacing one or more hyphens (e.g., "-") with an underscore character (e.g., "_"). In some embodiments, the first set of preprocessing steps may include splitting (e.g., tokenizing) the technical term at a "." or at a "_ to obtain a list of tokens for the technical term. In some embodiments, the first set of preprocessing steps may include tokenizing each token further using a regular expression (Regex) based tokenizer algorithm which modifies the strings/tokens to include only alphabetic characters (e.g., by removing numerical and/or special characters). In some embodiments, the first set of preprocessing steps may include converting uppercase letters to lowercase letters or vice versa. In some embodiments, the first set of preprocessing steps may include removing stop words (e.g., a, the, and) from the tokens. In some embodiments, the first set of preprocessing steps may include removal of any token of a pre-specified length (e.g., tokens of length 1). In some embodiments, the first set of preprocessing steps may include any suitable predefined rule (e.g., one or more rules that are predefined to remove token inconsistent cases). In some embodiments, the first set of preprocessing steps may include accessing a predefined synonym list and identifying synonyms for a token from a predefined association within the list, then adding the synonyms to the set of tokens. In some embodiments, the first set of preprocessing steps may include assigning a final list of tokens obtained using any suitable combination of the preprocessing steps above as a final list of tokens corresponding to a given technical term. As a non-limiting example, using the preprocessing steps above, a technical term such as "CUST_ADD123_ID4" may be tokenized to correspond to a token set of ["cust", "add", and "id"].

Similarly, a second set of preprocessing steps may be executed against each of the domain terms of the training data set. By way of example, the particular set of preprocessing steps executed against each domain term may include any suitable combination of the first preprocessing steps listed above. For example, each domain term may be modified to remove preceding and/or succeeding blank spaces. In some embodiments, the second set of preprocessing steps may include tokenizing each token using a Regex based tokenizer to modify the strings (e.g., the strings obtained from removing the blank spaces) to include only alphabetic characters. In some embodiments, the second set of preprocessing steps may include one or more operations that may be performed to remove inconsistent token cases. In some embodiments, the second set of preprocessing steps may include converting the token characters to lowercase if needed. In some embodiments, the second set of preprocessing steps may include removing any token of having a given length or length(s) (e.g., removing tokens of length 1, 2, etc.). In some embodiments, the second set of preprocessing steps may include assigning a final list of tokens obtained from the domain term using any suitable combination of the preprocessing steps above as a final list of tokens corresponding to a given domain term. As a non-limiting example, using the preprocessing steps above, a technical term such as "Customer Address" may be tokenized to correspond to a token set of ["customer", "address"].

The method 200 may proceed from 208 to 210, where one or more feature sets (also referred to as a "feature vector") may be generated. In some embodiments, a feature set may be generated for a pair of terms (e.g., a pair including a technical term and a domain term corresponding to row 308 of the training data set 300 of FIG. 3).

FIG. 4 illustrates a method 400 for generating a feature vector 402 corresponding to a pair of terms, in accordance with at least one embodiment. The method 400 may be performed by the data management service 103 of FIG. 1 or any suitable computing component of the cloud-computing patters of FIGS. 8-12.

The method 400 may begin at 404 where the technical term and domain term may be tokenized. Tokenizing the technical term and the domain term may utilize any suitable combination (e.g., a predefined combination) of the preprocessing steps described above in connection with 208 of FIG. 2.

At 406, one or more scores can be computed for the pair (and potentially, each pair in the training data set 300). In some embodiments, the scores computed may be one or more similarity scores that are generated using any suitable number of similarity assessment algorithms. A similarity assessment algorithm may be configured to assess an amount of similarity and/or disparity between input data including a pair of terms. Some example similarity assessment algorithms may include, but are not limited to a Jaro Winkler Distance Algorithm, a Levenshtein Distance algorithm, a Burrows Wheeler Transform Algorithm, an Overlap Algorithm (e.g., that identifies an amount of overlap between two input terms), and a prefix algorithm (e.g., an algorithm for comparing prefixes of two input terms for similarity/disparity).

In some embodiments, at least one of the scores may be computed. For example, a "left score" may be computed by calculating a first ratio of the unique number of intersected n-gram token between the two strings (e.g., the first token of one term (e.g., the technical term) being referred to as "token 1," and a first token of the other term (e.g., the domain term) being referred to as "token 2") to the number of n-grams in token 1. In some embodiments, a "right score" may be computed by calculating a ratio of unique intersected n-grams between two given strings to the unique number of n-grams in token 2. An "intersection over union score" can be computed by calculating a ratio of the unique number of intersected n-grams to the number of unique n-grams of the two given strings.

As a non-limiting example, consider the terms of row 308 of FIG. 3. For the source object (e.g., the technical term), "CUST_ADD123_ID4" may be tokenized according to the preprocessing steps discussed above in connection with 208 of FIG. 2 to generate a token set of ["cust", "add", "id"]. Similarly, the target object (e.g., the domain term, the term for which similar terms are sought) may be tokenized according to the preprocessing steps discussed at 208 in connection with domain terms to generate a token set of ["customer," "address"]. For each source object token (i.e., "cust", "add", and "id") the following algorithm may be applied. First, the algorithm may include computing a score between "cust" (e.g., token 1 of the source object) and "customer (e.g., token 1 of the target object) using a set of similarity algorithms 408. By way of example, if similarity algorithms 408 included all eight similarity algorithms discussed above, eights scores would be calculated, each quantifying a degree of similarity between "cust" and "customer" based on a corresponding similarity algorithm of the set. An example set of scores is depicted in row 410 (e.g., [0.5, 0.3, 0.4, 0.6, 0.77, 0.23, 0.67, 0.89]). An overall score (e.g., 4.36) can be computed for the similarity of "cust" and "customer" by summing the scores of row 410. Next, the algorithm may include computing scores between "cust" (e.g., token 1 of the source object) and "address" (e.g., token 2 of the target object) (corresponding to the set of scores of row 412 [0.2, 0.22, 0.19, 0.11, 0.1, 0.28, 0.23, 0.2). An overall score (e.g., 1.53) can be computed quantifying the similarity of "cust" and "address" by summing the scores of row 412. The same techniques can be applied to calculate a set of scores and an overall score for the comparisons identified for rows 414-420.

At 422, a feature vector (e.g., the score set corresponding to column 424 of a given row) with the highest overall score may be selected for each token of the technical term. For example, row 410 and row 412 may include overall scores for comparing "cust" (e.g., token 1 of the source term) to each of the target object's tokens (e.g., "customer" being token 1 of the target object, and "address" being token 2 of the target object). In this example, the vector of row 410, column 424 (e.g., [0.5, 0.3, 0.4, 0.6, 0.77, 0.23, 0.67, 0.89]) corresponding to the comparison of "cust" to "customer" is selected based on determining that the overall score for that comparison (e.g., 4.36) is higher than all the other overall scores of other comparisons that use the same source token (e.g., in this example, 1.53 corresponding to row 412). Similarly, a highest overall score for rows 414 and 416 may be utilized to determine a vector for comparisons that utilize the second token of the source object (e.g., "add"). In this example, the vector of row 416 may be selected based on determining the overall score for row 416 (e.g., 4.81) is higher than the overall score for row 414 (e.g., 0.964). A highest overall score for rows 418 and 420 may be utilized to determine a vector for comparisons that utilize the third token of the source object (e.g., "id"). In this example, the vector of row 420 may be selected based on determining the overall score for row 420 (e.g., 0.89) is higher than the overall score for row 418 (e.g., 0.82).

At 426, a final feature vector may be computed. In some embodiments, the final feature vector may be computed based on the feature vectors selected at 422. By way of example, the sum of each value of a feature vector may be summed with the other corresponding values of the remaining feature vectors and the sum may be divided by the number of feature vectors. In the ongoing example using three vectors, the computation can be expressed:

Vector 1: [a1,b1,c1,d1,e1,f1,g1,h1]

Vector 2: [a2,b2,c2,d2,e2,f2,g2,h2]

Vector 3: [a3,b3,c3,d3,e3,f3,g3,h3]

Final Feature Vector: [(a1+a2+a3)/3,(b1+b2+b3)/3, (c3+c2+c3)/3,(d1+d2+d3)/3,(e1+e2+e3)/3,(f1+ f2+f3)/3,(g1+g2+g3)/3,(h1+h2+h3)/3]

The computation using the vectors of rows 410, 416, and 420 is depicted at 428 and the final feature vector is depicted at 430. In some embodiments, any suitable combination of the final feature vector, the highest scored feature vectors (in this example the vectors corresponding to rows 410, 416, and 420), or the vectors computed for each comparison (e.g., the vectors corresponding to row 410-420) may be included as part of the training data set (e.g., in this example, as part of row 308) of FIG.

Returning to FIG. 2, once the final feature vector for each pair of terms has been computed it can be added to the training data set example such that each entry of the training data set includes the technical term, the domain term, the final feature vector, and a label indicating that the pair is similar (e.g., an acceptable match) or disparate (e.g., an unacceptable match).

At 212, one or more machine-learning models may be generated using the training data set as augmented with the final feature vectors calculated in accordance with FIG. 4. In some embodiments, each machine-learning model may be trained utilizing a unique supervised learning algorithm. By way of example only, in some embodiments four models may be created, each model being trained utilizing a logistic regression algorithm, a support vector machine algorithm, a random forest algorithm, and a two-layered neural network, respectively. Each model may be configured in this manner to identify a score (e.g., a confidence score that indicates a degree of confidence that the two input terms have over a threshold degree of similarity). As another example, the models may be configured to identify a score that quantifies a degree of similarity between the two input terms. It should be appreciated that other supervised learning algorithms may be utilized, and the particular supervised learning algorithm are utilized in this example for illustrative purposes only. The specific number of models trained may be greater or less than four, with the specific number and/or algorithms used being predefined or user configurable.

In some embodiments, some portion of the training data set (e.g., 60%, 50%, etc.) may be utilized to train the model(s), another portion of the training data set (e.g., 20%) may be used to tune the model, and the remaining portion not used for training (e.g., 20%, 30%, etc.) may be utilized to assess the accuracy of each model. For example, each of the remaining examples of the training data set that were not previously used for training, may be provided as input to the machine-learning model. The subsequent output from the machine-learning model may be utilized to determine whether the input terms are similar (e.g., having a confidence score over a threshold indicating similarity, having a similarity score that meets or exceeds a predefined similarity threshold, etc.) or disparate (e.g., having a confidence score under a threshold indicating disparity, having a similarity score that is under a predefined similarity threshold, etc.). Each model may be scored based on a ratio between the number of times the model provided output that agreed with the label of the training data set example over the total number of training data examples provided for the assessment. A model having the highest accuracy score may be selected for subsequent use. In some embodiments, each of the models may be stored in data store 214 and updated at any suitable time.

At runtime, a user may provide feedback indicating whether two terms deemed to be similar by the model are in fact similar. In some embodiments, the user may be provided a recommendation that recommends associated a domain term with a technical term identified by the model as being the most similar (e.g., having a highest value output) of a number of candidate terms. If the user accepts the recommendation (e.g., via user input such as selecting an "accept" button associated with the recommendation), the feedback may be utilized to identify a new training example that includes the pair of terms, their corresponding feature vectors, and an indication that the pair of terms are similar, or in other words, a good match. If the user explicitly rejects the recommendation or does not accept the recommendation within a predefined threshold, a new training data example may be added to the training data set that includes the pair of terms, their corresponding feature vectors, and an indication that the pair of terms are disparate, or in other words, mismatched.

In some embodiments, a data management service may utilize the model to identify a similar term for a set of input terms. As non-limiting example, the data management service may take a set of domain terms (e.g., a glossary) and identify one or more similar technical terms corresponding to a data entity using by calculating a feature vector for each unique domain term/technical term (DT/TT) pairing. In some embodiments, if the output of the model indicates the pair of terms are similar (e.g., a good match), the service may be configured to automatically generate and store an association between the two terms without needing advance user input. The user may be provided a list of these automatically generated associations and an interface to accept and/or reject the associations. If accepted or rejected, a new training data set example may be added corresponding to the terms of the accepted or rejected association that indicates the terms are similar/a match (for accepted associations) or disparate/mismatched (for rejected associations).

Additional training data examples generated based on user feedback may be referred to as "curated user feedback." The curated user feedback may be stored in any suitable storage location.

At any suitable time, process 200 may be repeated. However, in the ongoing example, the next time the process 200 is executed, the determination made at 202 may indicate that training has already occurred and thus the process may proceed to 216 where the curated training data (e.g., training data examples generated based on user feedback at run time) may be obtained. In some embodiments, the curated training data may include new training data examples only and may exclude training data examples that have been previously used to train or update the model(s).

At 218, the same types of preprocessing steps discussed at 208 may be performed for these curated training data examples. At 220, a feature set may be generated for each curated training data example in the manner discussed above at 210. At 222, the one or more models may be obtained from data store 214 and updated using the curated training data examples (now including corresponding the corresponding feature sets generated at 220). In this manner, user feedback may be utilized over time to improve the accuracy of the models. At any suitable time, the accuracy of the models may be re-evaluated using any suitable number of training data examples and a most-accurate model may be utilized for subsequent recommendations and/or the automatic generation of associations between a domain term and technical term.

Figure 5:
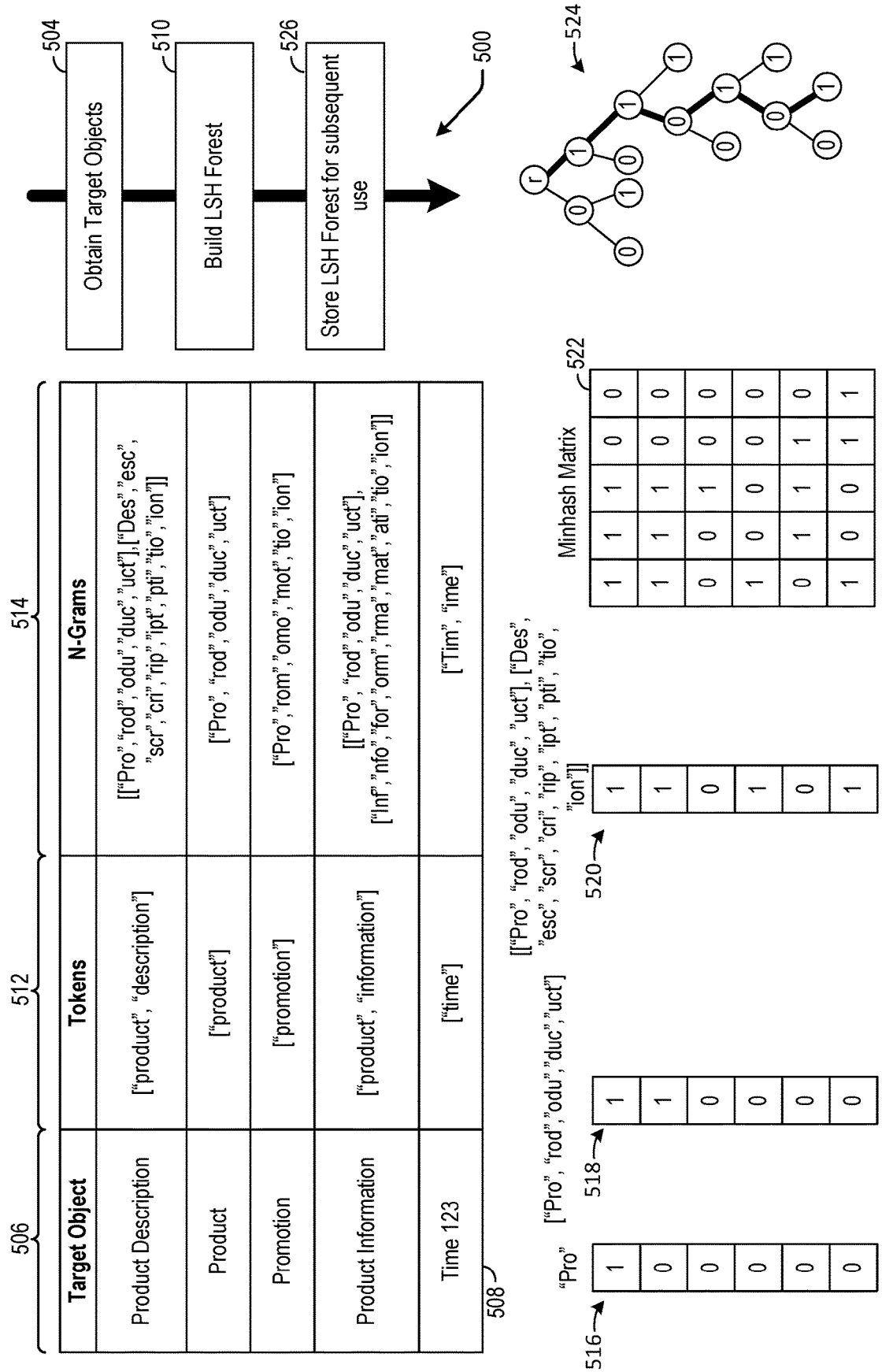
FIG. 5 illustrates an example method for building a Locality Sensitive Hashing (LSH) Forest, in accordance with at least one embodiment.

FIG. 5 illustrates an example method 500 for building a Locality Sensitive Hashing (LSH) Forest, in accordance with at least one embodiment. In some embodiments, the method 500 may be considered a preprocessing step executed before runtime. The method 500 may be performed by the data management service 103 of FIG. 1 or any suitable computing component of the cloud-computing patterns of FIGS. 8-12. Thus, the LSH forest generated using the operations described with respect to FIG. 5 may be generated by the data management service 103 or a different computing component but may be accessible to the data management service 103.

The general objective of the methods described herein, is to identify a most-similar term given an input term (e.g., a technical term that is most similar to a domain term, or vice versa). When the size of the data set used is small (e.g., a small number of domain terms when the input term is a technical term, or vice versa), one could compare each object (e.g., each domain term) to the query (e.g., the input technical term) to find the most similar object. However, such an approach becomes infeasible due to linear querying costs for larger data sets. The cost of computing similarity between the input term and every possible object can overwhelm the processing resources of the system. In a scenario with a relatively large data set, it is beneficial to identify a subset of candidate objects that are most likely to be similar to the input term. The method 500 may employ Locality Sensitive Hashing (LSH) with a minimum hashing (min-hash) function to identify such a subset. It may be used, as described further in FIG. 6, to reduce the dimensionality of the data set.

The method 500 may begin at 504 where a set of target object may be obtained. In this example, the set of target objects may be the set of all domain terms, although in other examples, the method 500 may be similarly executed to generate an LSH forest of technical terms. In some embodiments, two LSH forests may be generated, one for the set of all known domain terms, and one for the set of all known technical terms. However, for illustration, this example will utilize the set of domain terms for the target objects. An example set of domain terms is provided in column 506 of table 508.

At 510, an LSH forest may be built. To build the LSH forest, the target objects may first be tokenized (e.g., utilizing the preprocessing steps discussed above at 208 of FIG. 2). The corresponding set of tokens resulting from such tokenization is depicted for each target object in column 512 of table 508. Next, a set of n-gram tokens (also referred to as "n-grams") may be generated for each token of column 512. As depicted, the n used is 3, resulting in n-gram tokens having a character length of 3. However, the particular n used for the n-grams (e.g., n=2, n=5, etc.) may be predefined and/or user configurable. Next, a minimum hashing algorithm may be executed to generate a min-hash matrix for various granularities (e.g., for each n-gram, for the n-grams of a given token, and/or for the set of all n-grams of all tokens of a given target object). The min-hash matrix for the n-gram "Pro" is depicted at 516. The min-hash matrix for the set of n-grams of token ["Pro", "rod", "odu", "duc", "uct"] is depicted at 518. The min-hash matrix for the set of n-grams of all tokens in the domain term "Product Description" (e.g., Term [["Pro", "rod", "odu", "duc", "uct"], ["Des", "esc", "scr", "cri", "rip", "ipt", "pti", "tio", "ion"]]) is depicted at 520. The purpose of the min-hash matrix is to reduce the dimensionality of the n-gram sets, while maintaining the ability to assess the similarity between terms. The five target objects (e.g., domain terms) of table 508 may be represented by min-hash matrix 522, where each column of the min-hash matrix 522 represents a min-hash of a single target object.

Once the min-hash matrices are generated, a LSH function can be executed on the min-hash matrices (rather than the n-gram sets themselves). The LSH function may be configured to the min-hash matrices into buckets (e.g., each represented by a tree) such that similar min-hash matrices are hashed to the same bucket (e.g., tree), while dissimilar min-hash matrices are hashed to disparate buckets (e.g., disparate trees). Thus, after executing the LSH function, the LSH forest may include any suitable number of trees, each tree representing any suitable number of similar terms (terms that were deemed to be similar by virtue of hashing to the same tree). The domain term "Product Description" is represented in the form of tree 524, where the bolded edges and corresponding nodes represent the min-hash matrix for that domain term.

Once generated, the LSH forest may be stored in any suitable storage location at 526.

Figure 6:
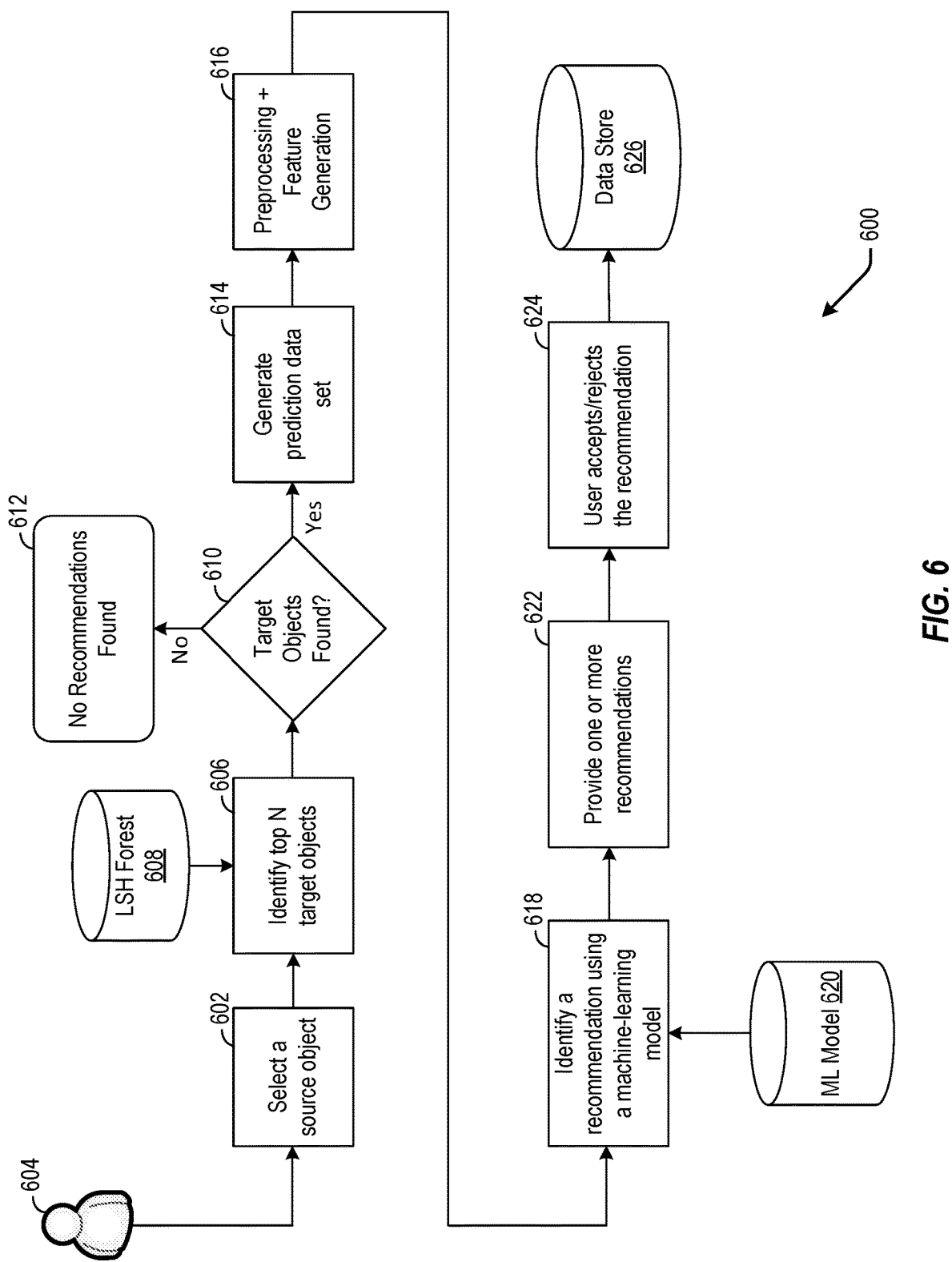
FIG. 6 illustrates an example method for generating a recommendation using a machine-learning model and an LSH forest, in accordance with at least one embodiment.

FIG. 6 illustrates an example method 600 for generating a recommendation using a machine-learning model (e.g., the machine-learning model trained as described above in connection with FIGS. 2-4) and an LSH forest (the LSH forest generated in accordance with method 500 of FIG. 5), in accordance with at least one embodiment.

The method 600 may begin at 602 where a user 604 may select a source object. As an example, the source object may be a technical term and the user 604 may access the source object via a user interface selection (e.g., by checking a box associated with the technical term, by typing in the technical term, by accessing a webpage associated with the technical term, or the like). As a non-limiting example, the user 604 may access a network page associated with a technical term "PROD_DESC." This technical term and/or network page may be associated with one or more data entities (e.g., a database, a file, a container, a data object, or any suitable portion of the same). It should be appreciated, however, that the method 600 may be similarity employed to identify a recommendation for a domain term. In such examples, the source object (e.g., input term for which a recommendation is sought) may be a domain term and the target objects (e.g., term from which a recommendation is selected) may be technical terms. In such examples, the LSH forest utilized may be one that includes the set of all technical terms (rather than the LSH forest generated from the domain terms utilized as target objects in FIG. 5).

At 606, the top N number of target objects may be identified. By way of example, the source object (e.g., "PROD_DESC") may be tokenized using the preprocessing steps described above in connection with FIG. 2, to generate a token set of ["prod", "desc"]. The tokens would be broken into n-grams (e.g., 3-gram) similar to the process discussed in connection with FIG. 5. The n-grams of the source object may be [["Pro", "rod"], ["Des", "esc"]]. A minimum hash matrix may be generated for each n-gram where subsequent n-grams would update the min-hash of tokens similar to that described at 516-520 of FIG. 5. The min-hash matrix for source object may be hashed using the same LSH hashing function utilized to generate the LSH Forest 608 (an example of the LSH forest generated using the method 500 of FIG. 5) and used to query the LSH forest 608. The result of the query may identify a particular tree of the LSH forest (or a top T number of LSH trees having the most similar min-hash matrices to the min-hash matrix of the source object). The identified tree(s) may include a set of candidate target objects from which a recommended target object may be identified. By utilizing the LSH forest, identifying a recommended target object need not utilize the entire domain term set, but rather a smaller set of candidate domain terms that, by virtue of generating the min-hash matrices and executing the LSH function, have already been determined to be similar to the source object to some degree. As a non-limiting example, the n-gram min-hash matrix for the example source object may be the same as the one depicted at 520 and associated with the domain term "Product Description." Thus, "Product Description" along with nearby siblings (e.g., 2 nearby siblings such as "Product" and "Product Information") in the forest as part of the top N (e.g., 3) terms identified from the LSH forest 608. However, as N is a number less than the number of target objects in the target object set, the potential target candidate set has been pruned from the total number of target objects to N (in the ongoing example, from 5 to 3).

At 610, a determination may be made as to whether any target objects were found by executing the operations discussed in connection with 606. If no target objects were found (e.g., the input term did not hash to a tree that represents any other terms), the method 600 may proceed to 612 where the user 604 is notified that no recommendation were found. In some embodiments, the user is affirmatively notified (e.g., via text presented at the network page associated with the input technical term) that no recommendations exist. In other embodiments, the notification may include simply not displaying any recommendations without explicitly notifying the user that no recommendations were found.

If any target objects were found at 610, the method 600 may proceed to 614 where a prediction data set may be generated. In some embodiments, generating a prediction data set may include generating a pairing, where each pair includes the source object (e.g., the technical term "PROD_DESC") and one of the sets of target objects (e.g., one or more domain terms) identified at 606 from the LSH forest 608.

At 616, a number of operations related to preprocessing and feature generation may be executed. These operations may correspond to the operations discussed at 208 and 210 of FIG. 2, and the method 400 of FIG. 4. In summary, the source object and target objects may be tokenized and each unique pair of <source object, target object T> identified at 614, the corresponding tokens may be utilized with a predefined set of similarity algorithms to generate a feature set as described in connection with FIG. 4. The feature set corresponding to a given pair may be added to the prediction data set. At 618, a machine-learning model (e.g., machine-learning model 620, an example of the machine-learning model trained in accordance with the method 200 of FIG. 2), may be retrieved and used to identify one or more recommendations for a target object (e.g., a domain term) that has been determined to be similar (to some degree) to the source object (e.g., the technical term "PROD_DESC"). For example, each training data set example of the prediction data set generated at 614 and processed/augmented at 616 may be utilized as input to the model. The output of each example may include a confidence score that indicates a degree of confidence that the two terms match. For example, the output of each input of the ongoing example may indicate the following confidence scores:

"PROD_DESC" and "Product Description"=0.89

"PROD_DESC" and "Product"=0.84

"PROD_DESC" and "Product Information"=0.78

At 622, one or more recommendation may be provided. In some examples, a highest-scored pairing may be selected and the target object (e.g., in this example, the domain term) may be provided as a recommendation. For example, the domain term "Product Description," by virtue of having the highest confidence score as provided by the machine-learning model 620, may be presented at the network page of the technical term.

At 624, the user may accept or reject the recommendation. By way of example, user interface options may be provided (e.g., via the network page associated with the technical term) to accept or reject the recommendation. In some embodiments, accepting the recommendation may include generating an association between the source term and the recommended target term and storing the association for future use. When a subsequent query is received (e.g., a query for "Product Description"), the association may be utilized to return the associated term (e.g., the technical term "PROD_DESC" corresponding to one or more data entities). Either accepting or rejecting the recommendation may be used as feedback to generate a new example for the training data set. For example, a new example for the training data set may include the source object, the target object, the tokens/n-grams/feature set generated at 616, and a label or indicating whether the source object and target object of the example were a good match (e.g., similar) when the recommendation was accepted or a bad match (e.g., disparate) when the recommendation was rejected. The examples may be stored in data store 626 which may be the storage from which curated training data is obtained as described at 216 of FIG. 2 when the model(s) are to be updated.

It should be appreciated that recommendations need not be initiated by user input. For example, operations described at 602-618 may be performed for all source objects in the system. That is, for example, all technical terms may be identified as source objects and the operations of 602-618 may be performed for each technical term to identify one or more recommended domain terms identified by the model as being the most similar to the technical term. The same process may be performed to identify recommended technical terms for each domain term of a set of domain terms (e.g., domain terms of a predefined glossary). In some embodiments, the most similar term (or a predefined number of highest scored target terms) may be selected and an association between the source object and the recommended target object may be automatically generated. For example, in some embodiments, a threshold value may be predefined (e.g., 0.8, 0.9, etc.) which defines a threshold confidence score. If an output of the model corresponding to a source object/target object pair breached the threshold value (e.g., is greater than 0.8), then an association between the two may automatically be generated. In some embodiments, a highest scored target object may be selected, and an association made between that target object (e.g., the recommended term) and the source object (e.g., the term for which a recommendation is sought). In some embodiments, the score for the highest scored target object may also need to breach the predefined threshold value before an association will be automatically generated.

Figure 7:
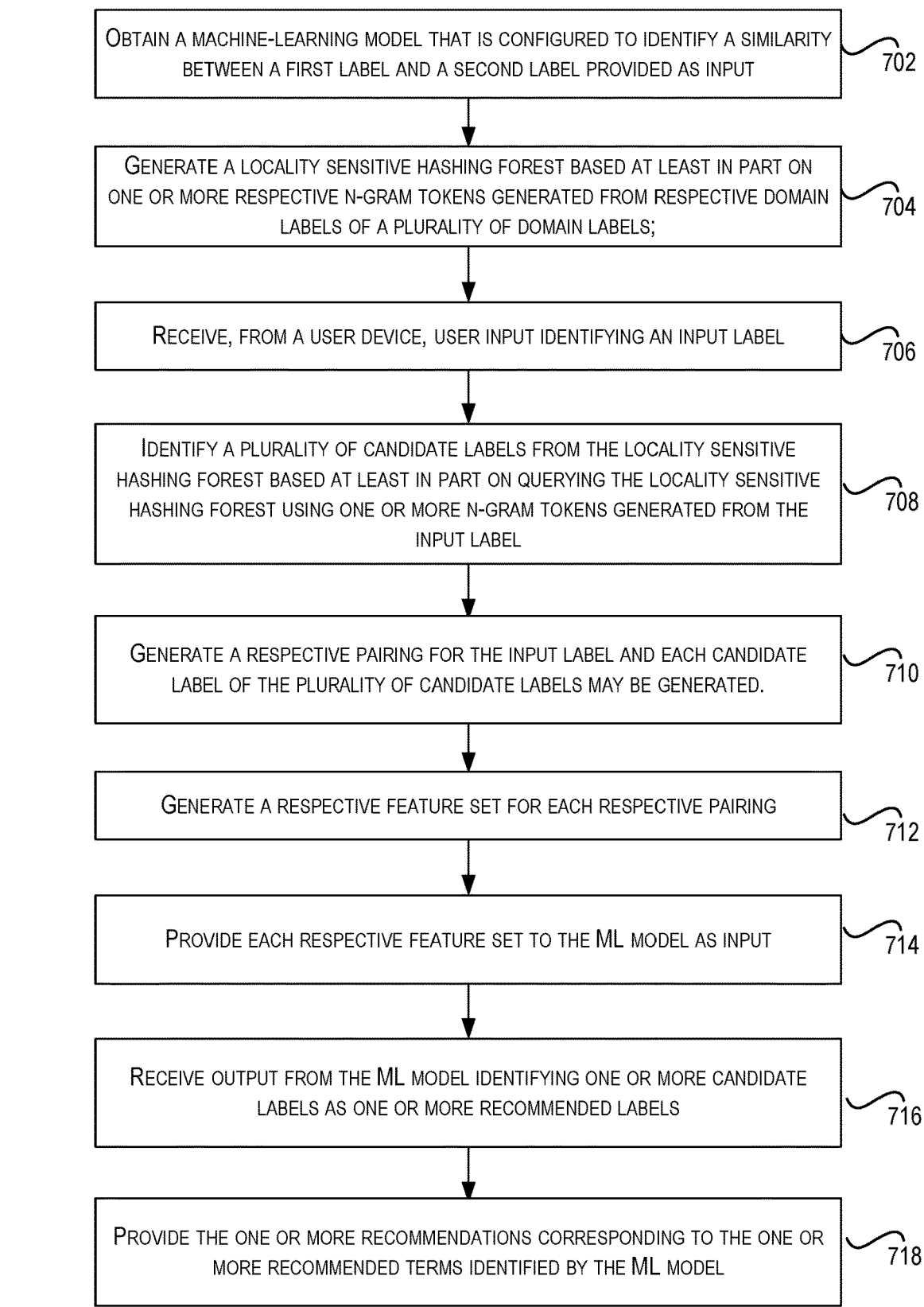
FIG. 7 is a block diagram illustrating an example method for identifying one or more recommended labels for an input label, in accordance with at least one embodiment.

FIG. 7 is a block diagram illustrating an example method 700 for identifying one or more recommended labels for an input label, in accordance with at least one embodiment. The method 700 may be performed, in whole or in part, by the data management service 103 of FIG. 3, operating as part of at least one of the cloud-computing patterns of FIGS. 8-12.

The method 700 may begin at 702, where a machine-learning model may be obtained, the machine-learning model (e.g., the machine-learning model 202) being configured to identify a similarity between a first label and a second label provided as input. In some embodiments, the machine-learning model has been previously trained (e.g., utilizing method 200 described in connection with FIG. 2) based at least in part on a supervised learning algorithm and a training data set (e.g., the training data set 300 of FIG. 3). The training data set may include pairs of labels that have been previously identified as being valid or invalid pairs. In some embodiments, the first label corresponds to a technical term and the second label corresponding to a domain term.

At 704, a locality sensitive hashing (LSH) forest may be generated based at least in part on one or more respective n-gram tokens generated from respective domain labels of a plurality of domain labels. By way of example, an LSH forest may be generated from a set of domain labels (e.g., the target objects of column 506 of FIG. 5). These domain labels may correspond to a predefined glossary. The LSH forest may be generated using the operations discussed in connection with FIG. 5.

At 706, user input is received from a user device. The user input may identify an input label. In some embodiments, the user input may include a user interface selection such as, but not limited to, selecting a link, checkbox, option, or the like, that is associated with a technical term.

At 708, a plurality of candidate labels may be identified from the locality sensitive hashing forest (e.g., the LSH forest generated in accordance with FIG. 5) based at least in part on querying the locality sensitive hashing forest using one or more n-gram tokens generated from the input label. In some embodiments, the input label may be tokenized according to the operations associated with the preprocessing steps discussed at 208 of FIG. 2 and a set of n-gram tokens may be generated for each token of the input label. In some embodiments, the plurality of candidate labels identified from the LSH forest comprise a subset of domain labels identified from the plurality of domain labels.

At 710, a respective pairing for the input label and each candidate label of the plurality of candidate labels is generated. For example, the input label is paired with each candidate label to generate a number of unique pairings.

At 712, a respective feature set is generated for each respective pairing of the input label and each candidate label. In some embodiments, a respective feature set is generated based at least in part on executing the operations discussed in connection with FIG. 4.

At 714, each respective feature set is provided to the machine-learning model (e.g., the model 202) as input.

At 716, output from the machine-learning model is received. In some embodiments, the output identifies one or more of the candidate labels as one or more recommended labels, the one or more recommended labels being identified by the output as being similar to the input term. A description of the output is described in more detail above with respect to FIG. 6.

At 718, the one or more recommendations corresponding to the one or more recommended terms identified by the machine-learning model are provided (e.g., via the user device and/or user interface from which the user input was received).

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
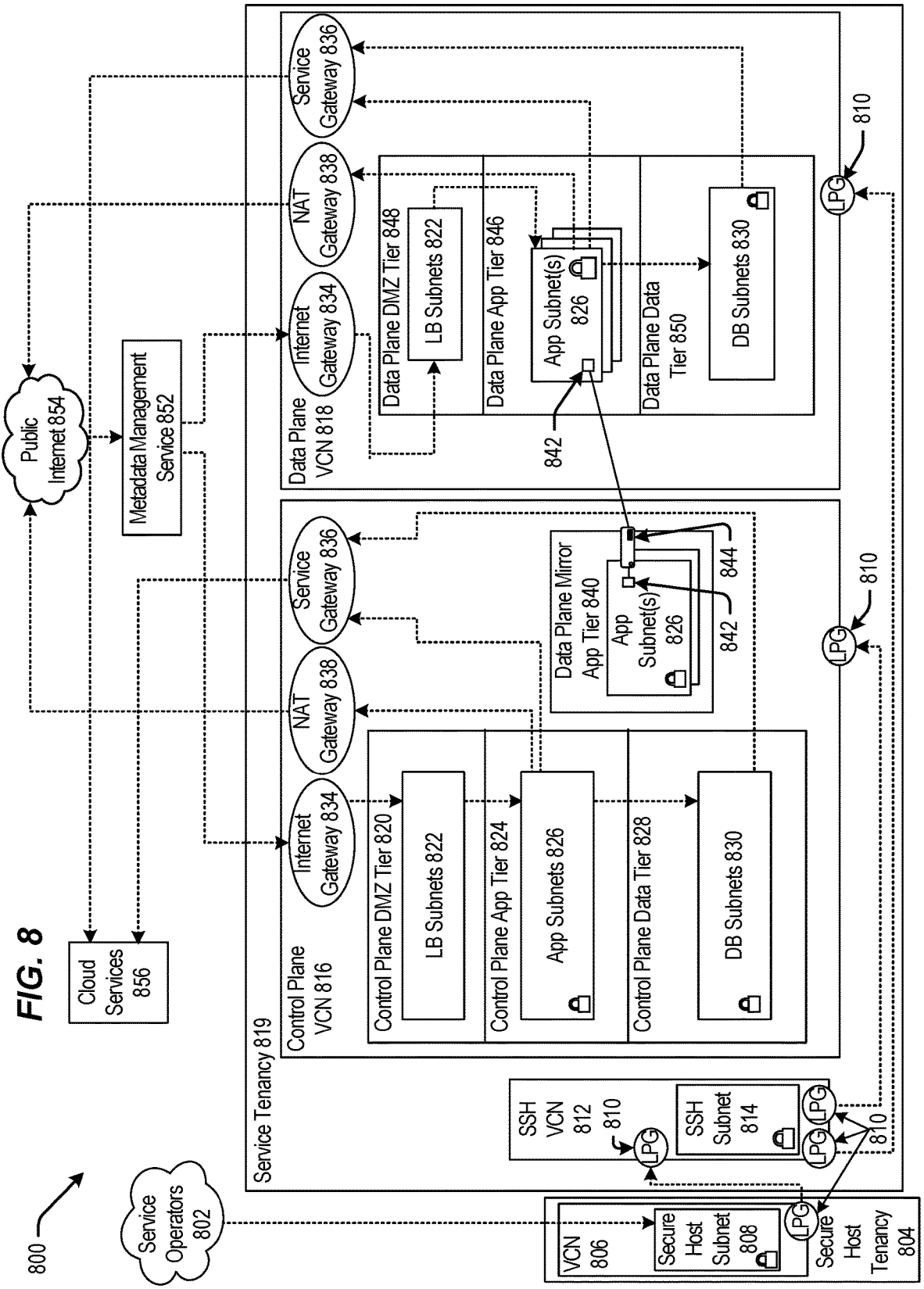
FIG. 8 is a block diagram illustrating a pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers, and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Memory that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
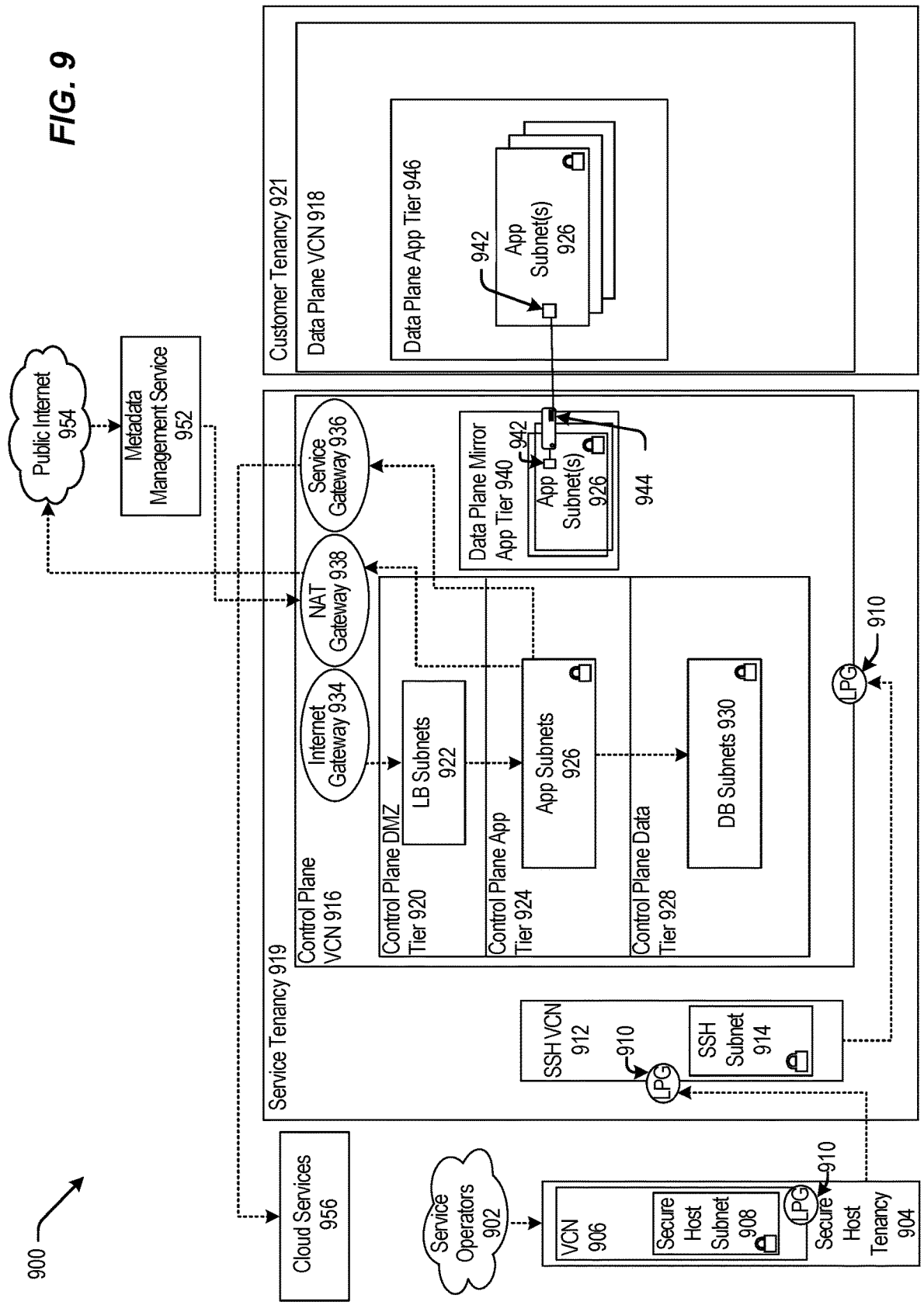
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g. the control plane DMZ tier 820 of FIG. 8) that can include LB subnet(s) 922 (e.g. LB subnet(s) 822 of FIG. 8), a control plane app tier 924 (e.g. the control plane app tier 824 of FIG. 8) that can include app subnet(s) 926 (e.g. app subnet(s) 826 of FIG. 8), a control plane data tier 928 (e.g. the control plane data tier 828 of FIG. 8) that can include database (DB) subnet(s) 930 (e.g. similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g. the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g. the service gateway of FIG. 8) and a network address translation (NAT) gateway 938 (e.g. the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 6 in Region 2.

Figure 10:
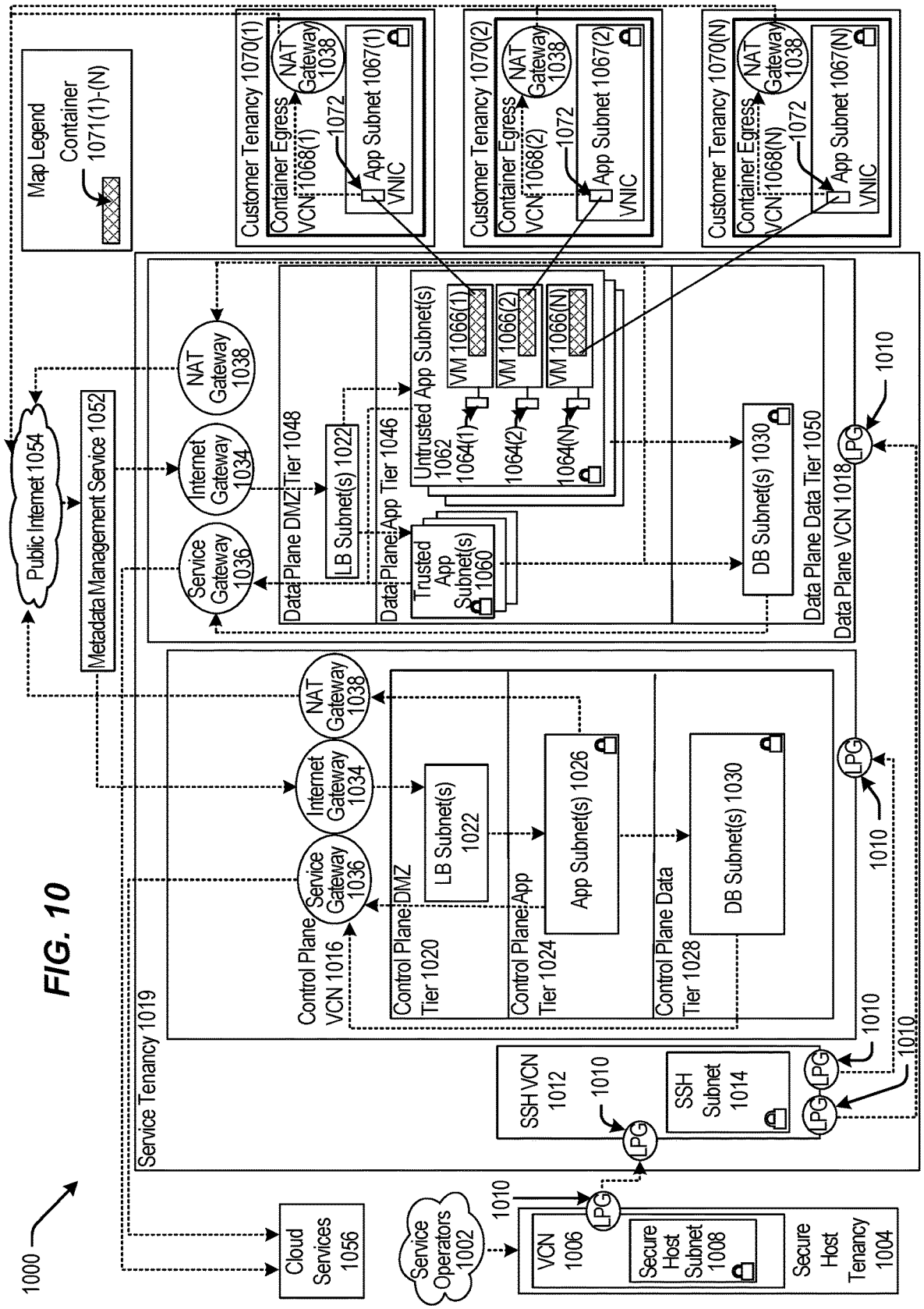
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g. the LPG 810 of FIG. 8) that can be communicatively coupled to an SSH VCN 1012 (e.g. the SSH VCN 812 of FIG. 8) via an LPG 1010 contained in the SSH VCN 1012. The SSH VCN 1012 can include an SSH subnet 1014 (e.g. the SSH subnet 814 of FIG. 8), and the SSH VCN 1012 can be communicatively coupled to a control plane VCN 1016 (e.g. the control plane VCN 816 of FIG. 8) via an LPG 1010 contained in the control plane VCN 1016 and to a data plane VCN 1018 (e.g. the data plane 818 of FIG. 8) via an LPG 1010 contained in the data plane VCN 1018. The control plane VCN 1016 and the data plane VCN 1018 can be contained in a service tenancy 1019 (e.g. the service tenancy 819 of FIG. 8).

The control plane VCN 1016 can include a control plane DMZ tier 1020 (e.g. the control plane DMZ tier 820 of FIG. 8) that can include load balancer (LB) subnet(s) 1022 (e.g. LB subnet(s) 822 of FIG. 8), a control plane app tier 1024 (e.g. the control plane app tier 824 of FIG. 8) that can include app subnet(s) 1026 (e.g. similar to app subnet(s) 826 of FIG. 8), a control plane data tier 1028 (e.g. the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 8) and a network address translation (NAT) gateway 1038 (e.g. the NAT gateway 838 of FIG. 8). The control plane VCN 1016 can include the service gateway 1036 and the NAT gateway 1038.

The data plane VCN 1018 can include a data plane app tier 1046 (e.g. the data plane app tier 846 of FIG. 8), a data plane DMZ tier 1048 (e.g. the data plane DMZ tier 848 of FIG. 8), and a data plane data tier 1050 (e.g. the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g. public Internet 854 of FIG. 8).

The Internet gateway 1034 contained in the control plane VCN 1016 and contained in the data plane VCN 1018 can be communicatively coupled to a metadata management service 1052 (e.g. the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071 (1)-(N) may be communicatively coupled to the customer tenancy 1070 and may be configured to transmit or receive data from the customer tenancy 1070. The containers 1071 (1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
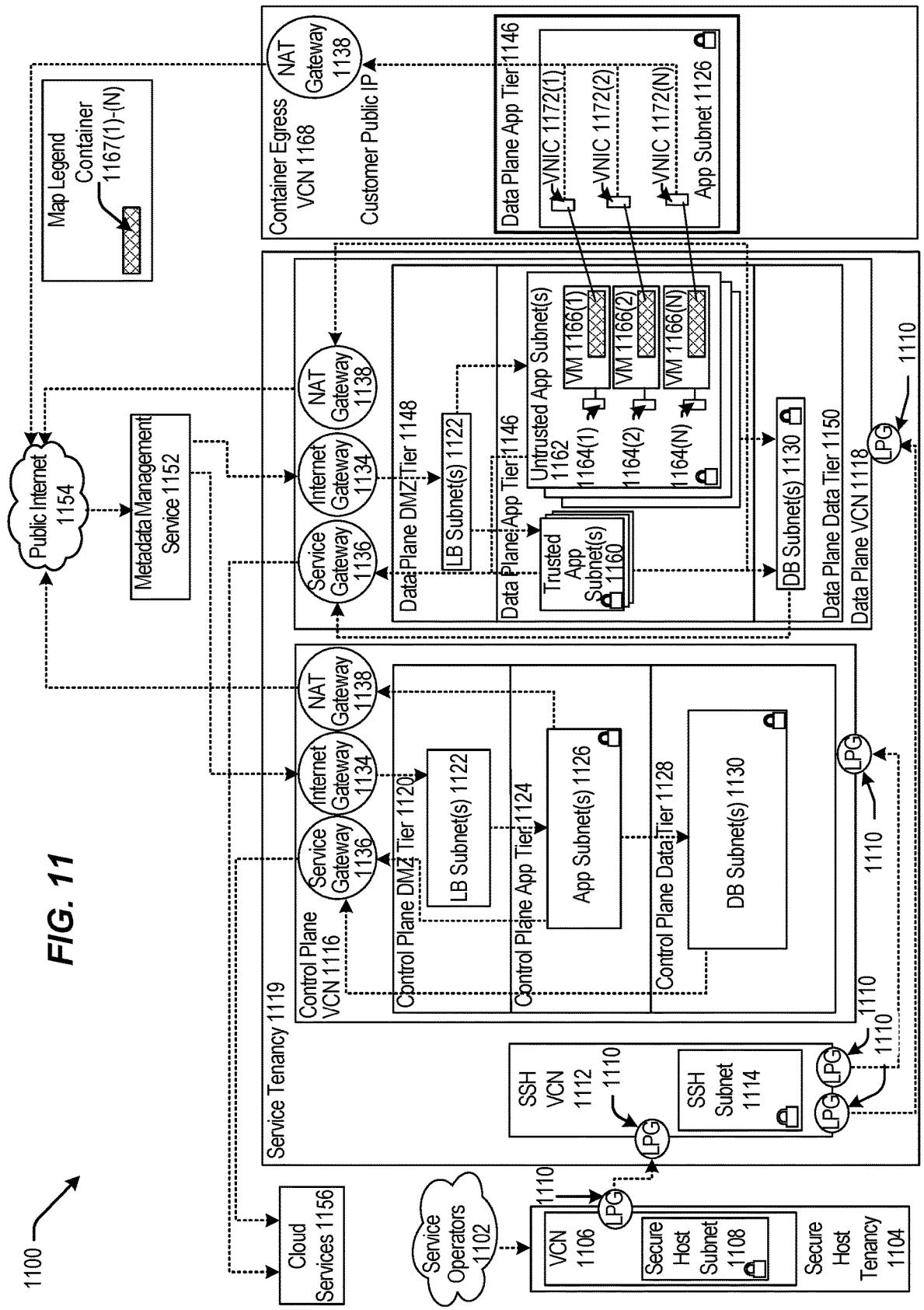
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 802 of FIG. 8) can be communicatively coupled to a secure host tenancy 1104 (e.g. the secure host tenancy 804 of FIG. 8) that can include a virtual cloud network (VCN) 1106 (e.g. the VCN 806 of FIG. 8) and a secure host subnet 1108 (e.g. the secure host subnet 808 of FIG. 8). The VCN 1106 can include an LPG 1110 (e.g. the LPG 810 of FIG. 8) that can be communicatively coupled to an SSH VCN 1112 (e.g. the SSH VCN 812 of FIG. 8) via an LPG 1110 contained in the SSH VCN 1112. The SSH VCN 1112 can include an SSH subnet 1114 (e.g. the SSH subnet 814 of FIG. 8), and the SSH VCN 1112 can be communicatively coupled to a control plane VCN 1116 (e.g. the control plane VCN 816 of FIG. 8) via an LPG 1110 contained in the control plane VCN 1116 and to a data plane VCN 1118 (e.g. the data plane 818 of FIG. 8) via an LPG 1110 contained in the data plane VCN 1118. The control plane VCN 1116 and the data plane VCN 1118 can be contained in a service tenancy 1119 (e.g. the service tenancy 819 of FIG. 8).

The control plane VCN 1116 can include a control plane DMZ tier 1120 (e.g. the control plane DMZ tier 820 of FIG. 8) that can include LB subnet(s) 1122 (e.g. LB subnet(s) 822 of FIG. 8), a control plane app tier 1124 (e.g. the control plane app tier 824 of FIG. 8) that can include app subnet(s) 1126 (e.g. app subnet(s) 826 of FIG. 8), a control plane data tier 1128 (e.g. the control plane data tier 828 of FIG. 8) that can include DB subnet(s) 1130 (e.g. DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 8) and a network address translation (NAT) gateway 1138 (e.g. the NAT gateway 838 of FIG. 8). The control plane VCN 1116 can include the service gateway 1136 and the NAT gateway 1138.

The data plane VCN 1118 can include a data plane app tier 1146 (e.g. the data plane app tier 846 of FIG. 8), a data plane DMZ tier 1148 (e.g. the data plane DMZ tier 848 of FIG. 8), and a data plane data tier 1150 (e.g. the data plane data tier 850 of FIG. 8). The data plane DMZ tier 1148 can include LB subnet(s) 1122 that can be communicatively coupled to trusted app subnet(s) 1160 (e.g. trusted app subnet(s) 1060 of FIG. 10) and untrusted app subnet(s) 1162 (e.g. untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g. public Internet 854 of FIG. 8).

The Internet gateway 1134 contained in the control plane VCN 1116 and contained in the data plane VCN 1118 can be communicatively coupled to a metadata management service 1152 (e.g. the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
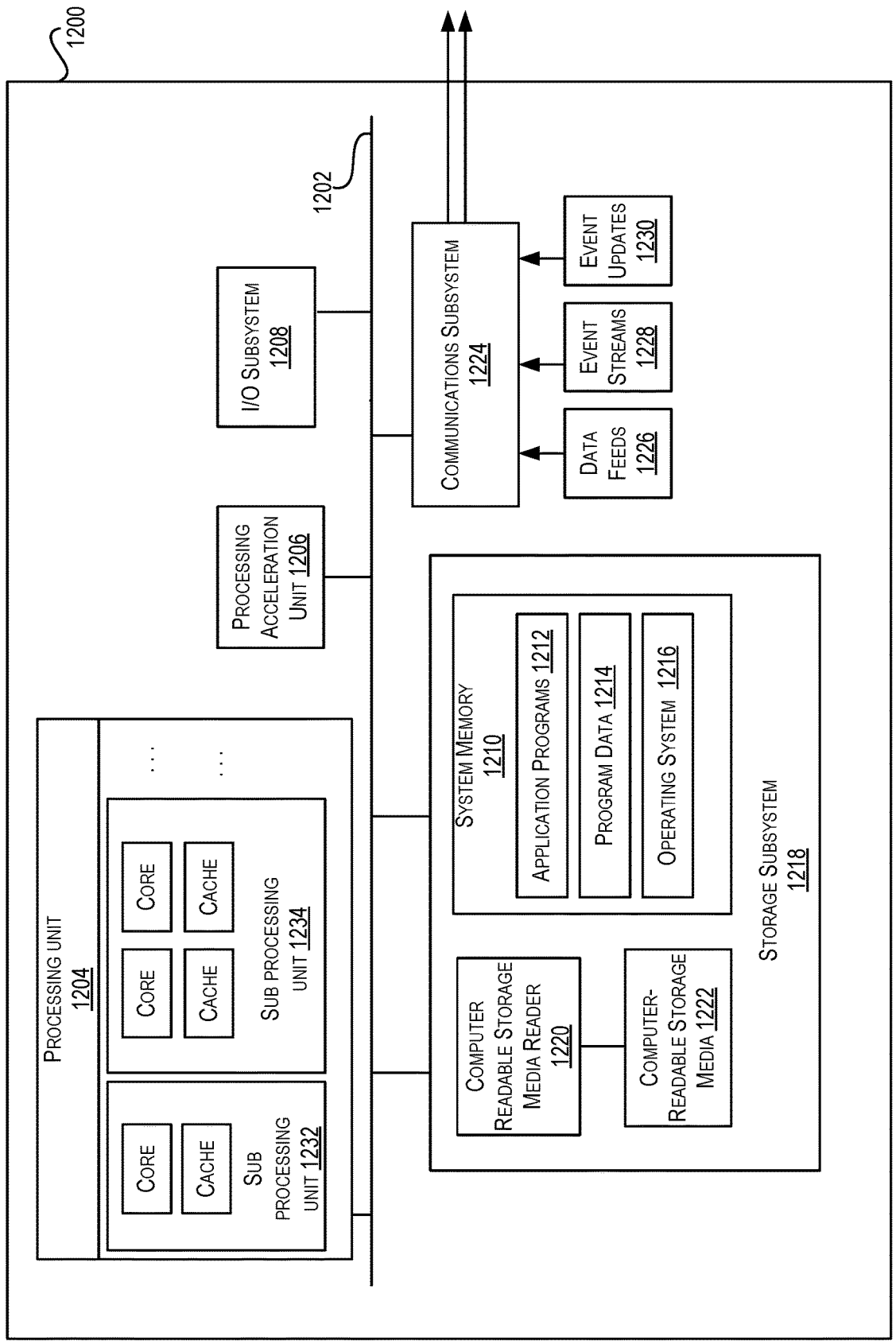
FIG. 12 is a block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some, or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments, and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics, and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random-access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random-access memory (SRAM) or dynamic random-access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   receiving, from a user interface, user input identifying a domain term;
   identifying, from a locality sensitive hashing (LSH) forest, a plurality of candidate technical terms for the domain term based at least in part on querying the LSH forest using one or more n-gram tokens generated from the domain term, the LSH forest being previously generated based at least in part on one or more respective n-gram tokens of a plurality of technical terms;
   generating a feature set for a pairing comprising the domain term and a technical term of the plurality of technical terms;
   providing the feature set to a machine-learning model as input, the machine-learning model being configured to identify a similarity between the domain term and the technical term based at least in part on feature set provided as input, the machine-learning model being previously trained based at least in part on a supervised learning algorithm and a training data set including the feature sets of pairs of technical terms and domain terms that have been previously identified as being valid or invalid pairs;
   receiving output from the machine-learning model, the output identifying similarity scores for the pairing; and
   presenting, via the user interface, a recommended term for the domain term corresponding to a particular technical term identified based at least in part on the similarity scores.

2. The computer-implemented method of claim 1, further comprising generating the LSH forest based at least in part on one or more respective n-gram tokens generated from respective technical terms of the plurality of technical terms.

3. The computer-implemented method of claim 1, wherein the feature set for the pairing of the domain term with the technical term comprises a plurality of similarity scores, the plurality of similarity scores being generated based at least in part on providing the pairing as input to a plurality of similarity algorithms, each of the plurality of similarity algorithms being configured to assign the pairing a score indicating a degree of similarity between the domain term and the technical term of the pairing.

4. The computer-implemented method of claim 1, wherein generating the LSH comprises:
   generating respective sets of n-gram tokens for each of the technical terms of the plurality of technical terms;
   computing a plurality of minimum hash values for each n-gram token of each technical term of the plurality of technical terms based at least in part on the respective sets of n-gram tokens and a hashing function; and
   generating a plurality of tree structures for the LSH forest based at least in part on the plurality of minimum hash values.

5. The computer-implemented method of claim 1, further comprising:
   generating, automatically or in response to subsequent user input, an association between the domain term provided as the input and the recommended term; and
   storing the association between the domain term and the recommended term for subsequent use.

6. The computer-implemented method of claim 5, further comprising providing the association between the domain term and the recommended term as additional training data with which the machine-learning model is updated.

7. The computer-implemented method of claim 5, further comprising:
   receiving a search query comprising one or more search terms; and
   obtaining a set of search results based at least in part on executing a subsequent query with the one or more search terms, the one or more search terms comprising at least the recommended term, the recommended term being obtained as a search result of the set of search results based at least in part on the association between the domain term and the recommended term.

8. A data management service, comprising:
one or more processors; and
one or more memories storing executable instructions that, when executed with the one or more processors, cause the data management service to:
  receive, from a user interface, user input identifying a domain term;
  identify, from a locality sensitive hashing (LSH) forest, a plurality of candidate technical terms for the domain term based at least in part on querying the LSH forest using one or more n-gram tokens generated from the domain term, the LSH forest being previously generated based at least in part on one or more respective n-gram tokens of a plurality of technical terms;
  generate a feature set for a pairing comprising the domain term and a technical term of the plurality of technical terms;
  provide the feature set to a machine-learning model as input, the machine-learning model being configured to identify a similarity between the domain term and the technical term based at least in part on feature set provided as input, the machine-learning model being previously trained based at least in part on a supervised learning algorithm and a training data set including the feature sets of pairs of technical terms and domain terms that have been previously identified as being valid or invalid pairs;
  receive output from the machine-learning model, the output identifying similarity scores for the pairing; and
  present, via the user interface, a recommended term for the domain term corresponding to a particular technical term identified based at least in part on the similarity scores.

9. The data management service of claim 8, wherein executing the executable instructions further causes the data management service to generate the LSH forest based at least in part on one or more respective n-gram tokens generated from respective technical terms of the plurality of technical terms.

10. The data management service of claim 8, wherein the feature set for the pairing of the domain term and the technical term comprises a plurality of similarity scores, the plurality of similarity scores being generated based at least in part on providing the pairing as input to a plurality of similarity algorithms, each of the plurality of similarity algorithms being configured to assign the pairing a score indicating a degree of similarity between the domain term and the technical term of the pairing.

11. The data management service of claim 8, wherein generating the LSH forest causes the data management service to:
  generate respective sets of n-gram tokens for each of the technical terms of the plurality of technical terms;
  compute a plurality of minimum hash values for each n-gram token of each technical term of the plurality of technical terms based at least in part on the respective sets of n-gram tokens and a hashing function; and
  generate a plurality of tree structures for the LSH forest based at least in part on the plurality of minimum hash values.

12. The data management service of claim 8, wherein executing the executable instructions further causes the data management service to:
  generate, automatically or in response to subsequent user input, an association between the domain term and the recommended term; and
  store the association between the domain term and the recommended term for subsequent use.

13. The data management service of claim 12, wherein executing the executable instructions further causes the data management service to provide the association between the domain term and the recommended term as additional training data with which the machine-learning model is updated.

14. The data management service of claim 12, wherein executing the executable instructions further causes the data management service to:
  receive a search query comprising one or more search terms; and
  obtain a set of search results based at least in part on executing a subsequent query with the one or more search terms, the one or more search terms comprising at least the recommended term, the recommended term being obtained as a search result of the set of search results based at least in part on the association between the domain term and the recommended term.

15. A non-transitory computer-readable medium comprising executable instructions that, when executed with one or more processors of a computing device, cause the computing device to:
  receive, from a user interface, user input identifying a domain term;
  identify, from a locality sensitive hashing (LSH) forest, a plurality of candidate technical terms for the domain term based at least in part on querying the LSH forest using one or more n-gram tokens generated from the domain term, the LSH forest being previously generated based at least in part on one or more respective n-gram tokens of a plurality of technical terms;
  generate a feature set for a pairing comprising the domain term and a technical term of the plurality of technical terms;
  provide the feature set to a machine-learning model as input, the machine-learning model being configured to identify a similarity between the domain term and the technical term based at least in part on feature set provided as input, the machine-learning model being previously trained based at least in part on a supervised learning algorithm and a training data set including the feature sets of pairs of technical terms and domain terms that have been previously identified as being valid or invalid pairs;
  receive output from the machine-learning model, the output identifying similarity scores for the pairing; and
  present, via the user interface, a recommended term for the domain term corresponding to a particular technical term identified based at least in part on the similarity scores.

16. The non-transitory computer-readable medium of claim 15, wherein the feature set for the pairing of the domain term and the technical term comprises a plurality of similarity scores, the plurality of similarity scores being generated based at least in part on providing the pairing as input to a plurality of similarity algorithms, each of the plurality of similarity algorithms being configured to assign the pairing a score indicating a degree of similarity between the domain term and the technical term of the pairing.

17. The non-transitory computer-readable medium of claim 15, wherein generating the LSH forest causes the computing device to:

generate respective sets of n-gram tokens for each of the technical terms of the plurality of technical terms;

compute a plurality of minimum hash values for each n-gram token of each technical term of the plurality of technical terms based at least in part on the respective sets of n-gram tokens and a hashing function; and generate a plurality of tree structures for the LSH forest based at least in part on the plurality of minimum hash values.

18. The non-transitory computer-readable medium of claim 15, wherein executing the executable instructions further causes the computing device to:

generate, automatically or in response to subsequent user input, an association between the domain term and the recommended term; and store the association between the domain term and the recommended term for subsequent use.

19. The non-transitory computer-readable medium of claim 18, wherein executing the executable instructions further causes the computing device to provide the association between the domain term and the recommended term as additional training data with which the machine-learning model is updated.

20. The non-transitory computer-readable medium of claim 18, wherein executing the executable instructions further causes the computing device to:

receive a search query comprising one or more search terms; and obtain a set of search results based at least in part on executing a subsequent query with the one or more search terms, the one or more search terms comprising at least the recommended term, the recommended term being obtained as a search result of the set of search results based at least in part on the association between the domain term and the recommended term.

* * * * *